United States Patent
Madhusudan

(10) Patent No.: US 12,489,132 B2
(45) Date of Patent: Dec. 2, 2025

(54) LIGHTWEIGHT FUEL CELL STACK END PLATE

(71) Applicant: Bell Textron Inc., Fort Worth, TX (US)

(72) Inventor: Phalgun Madhusudan, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 124 days.

(21) Appl. No.: 17/315,328

(22) Filed: May 9, 2021

(65) Prior Publication Data
US 2022/0359901 A1   Nov. 10, 2022

(51) Int. Cl.
*H01M 8/248* (2016.01)

(52) U.S. Cl.
CPC ........ *H01M 8/248* (2013.01); *H01M 2250/20* (2013.01)

(58) Field of Classification Search
CPC .................................................... H01M 8/248
See application file for complete search history.

(56) References Cited

U.S. PATENT DOCUMENTS

| | | | | |
|---|---|---|---|---|
| 4,964,936 A | * | 10/1990 | Ferro | B29C 44/56 264/321 |
| 5,114,807 A | * | 5/1992 | Rowlette | H01M 10/18 429/152 |
| 2008/0057372 A1 | * | 3/2008 | Sommer | H01M 8/04 429/444 |
| 2009/0286134 A1 | * | 11/2009 | Kim | H01M 8/0223 429/423 |
| 2016/0160363 A1 | * | 6/2016 | Marchal | C25B 9/00 204/279 |
| 2016/0344056 A1 | * | 11/2016 | Kniajanski | C25D 17/10 |
| 2018/0339781 A1 | * | 11/2018 | Vander Lind | H01M 16/00 |
| 2018/0342752 A1 | * | 11/2018 | Park | H01M 8/0263 |
| 2022/0289379 A1 | * | 9/2022 | Morrison | B64C 39/024 |

FOREIGN PATENT DOCUMENTS

| | | | |
|---|---|---|---|
| KR | 2009106670 A | * | 10/2009 |
| KR | 20090106670 A | * | 10/2009 |
| KR | 101379323 B1 | * | 3/2014 |
| KR | 101693338 B1 | * | 1/2017 |
| KR | 2021014707 A | * | 2/2021 |

OTHER PUBLICATIONS

ScienceDirect Bipolar Plate summary from Advances in Hydrogen Production, Storage and Distribution, 2014 (Year: 2014).*
KR 20090106670 English Translation (Year: 2009).*

* cited by examiner

*Primary Examiner* — Jimmy Vo
(74) *Attorney, Agent, or Firm* — Lightfoot & Alford PLLC

(57) ABSTRACT

A method of constructing a fuel cell system includes providing an open cell structure to form a first end plate, filling at least part of the open cell structure with a stiffening material, disposing a fuel cell stack between the first end plate and a second end plate, and compressing the fuel cell stack by moving the first end plate toward the second end plate. A fuel cell system includes a first end plate comprising an open cell structure, a second end plate, and a fuel cell stack compressed between the first end plate and the second end plate.

13 Claims, 11 Drawing Sheets

LIGHTWEIGHT FUEL CELL STACK END PLATE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Some aircraft rely on an onboard fuel cell system as an electricity power-source for powering the aircraft. In some high compression fuel cell systems, the fuel cell stack is compressed between two metallic end plates. While the metallic end plates are functional, they are very heavy and a detriment to performance and efficiency of aircraft.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure provides an electric-powered aircraft and an associated fuel cell system. The fuel cell systems disclosed herein can comprise one or more components and functionality to provide relatively lighter weight fuel cell stack end plates for high compression fuel cell stacks as compared to conventional end plates.

Figure 1:
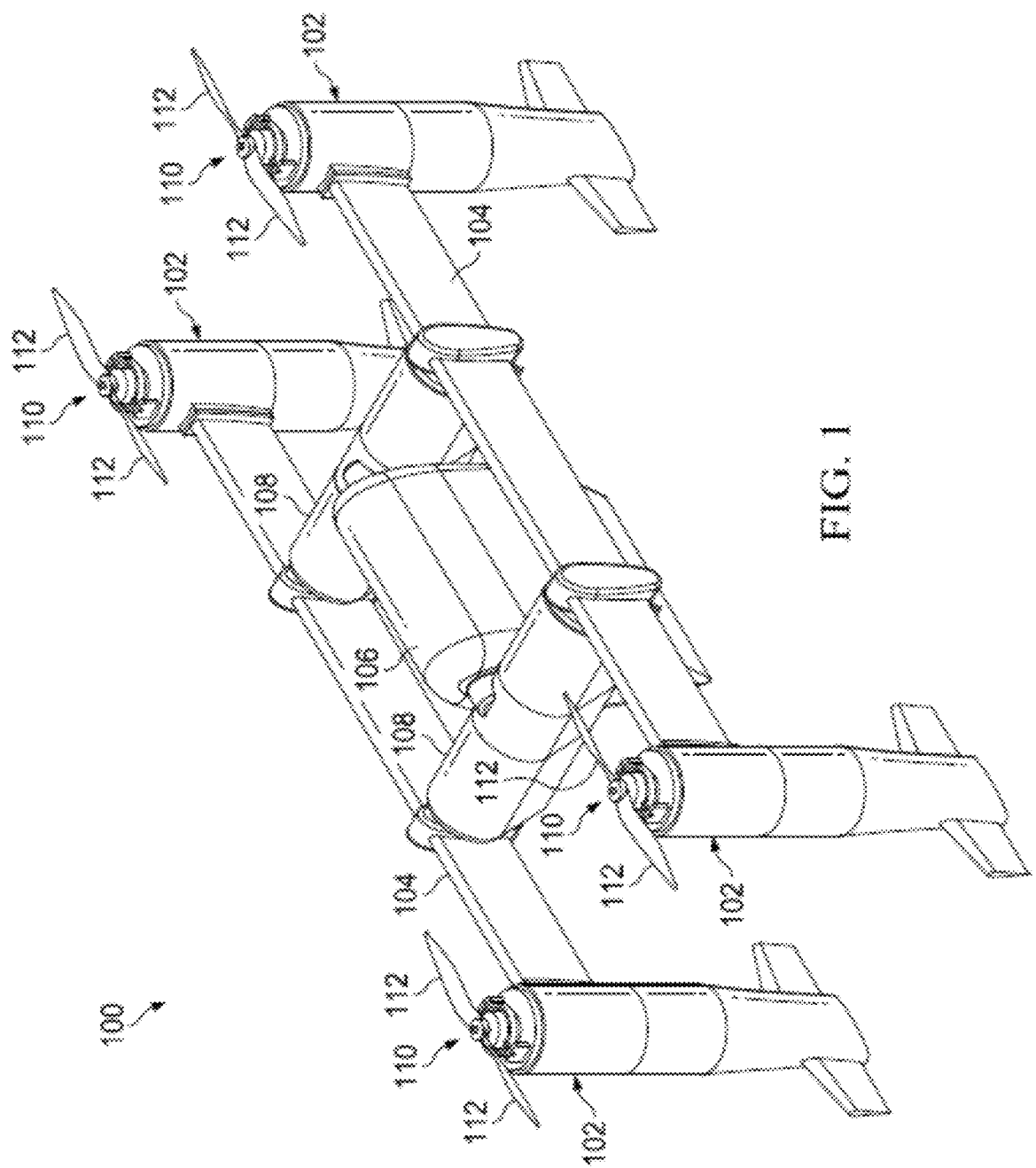
FIG. 1 illustrates an oblique view of an aircraft according to an embodiment of this disclosure.

FIG. 1 illustrates an oblique view of a tailsitter unmanned aerial vehicle ("UAV") 100 operable to transition between thrust-borne lift in a vertical takeoff and landing ("VTOL") orientation and wing-borne lift in a biplane orientation. In some embodiments, UAV 100 is a Bell Autonomous Pod Transport ("APT") aircraft. In the VTOL orientation, thrust modules 102 provide thrust-borne lift and, in the biplane orientation, thrust modules 102 provide forward thrust and the forward airspeed of UAV 100 provides wing-borne lift. Thrust modules 102 are mounted to wings 104, which generate lift responsive to forward airspeed when the UAV 100 is in the biplane orientation. Wings 104 are mounted to a payload 106 of UAV 100 by trusses 108. Each thrust module 102 includes a rotor assembly 110 with propellers 112 configured to rotate to provide thrust and direct ram air and propeller wash toward thrust module 102.

Figure 2:
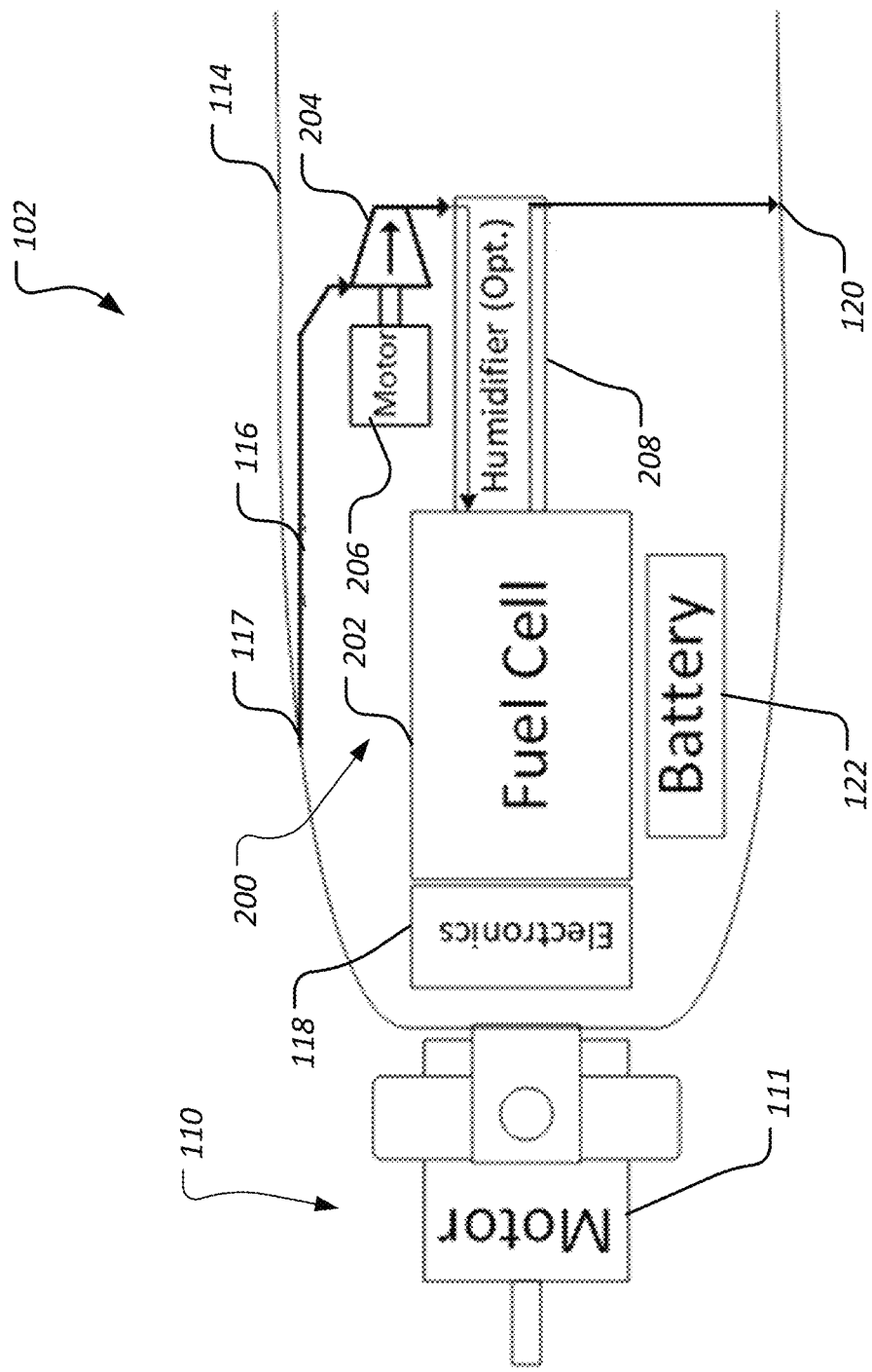
FIG. 2 illustrates a cutaway view of a nacelle of the aircraft of FIG. 1.

Referring to FIG. 2, each thrust module 102 includes a nacelle 114 which houses a passive ram air path 116 configured to direct passive ambient air from outside of UAV 100 toward a fuel cell system 200. In some cases, the air flowing through path 116 can be ram air that enters path 116 based on dynamic pressure created by the motion of UAV 100. In some cases, the air flowing through path 116 can be propeller wash displaced by propellers 112. In some cases, air flowing through path 116 is a combination of ram air and propeller wash. Although this disclosure refers to the air passing through path 116 as "ram air," one with skill in the art will understand that any of a number of sources can force air through path 116, such propeller wash displaced by rotor assembly 110.

Operation of thrust module 102 and fuel cell system 200 can be controlled by electronics node 118. Electronics node 118 preferably includes non-transitory computer readable media including a set of computer instructions executable by one or more processors for controlling operation of the thrust module 102 and fuel cell system 200. Fuel cell system 200 is configured to provide electrical power to thrust module 102 to power electric motor 111 of rotor assembly 110 and/or other components while also charging a battery 122. In this embodiment, fuel cell system 200 comprises fuel cell stack 202 that comprises a cathode, a compressor 204 powered by a motor 206, and an optional humidifier 208 through which path 116 may pass. Most generally, air can be moved through thrust module 102 by entering the nacelle 114 at inlet 117 of path 116 and exiting the nacelle 114 at an outlet 120 of path 116. In this embodiment, fuel cell system 200 can supply electrical power to any of the thrust module 102 components selectively and simultaneously.

Figure 3:
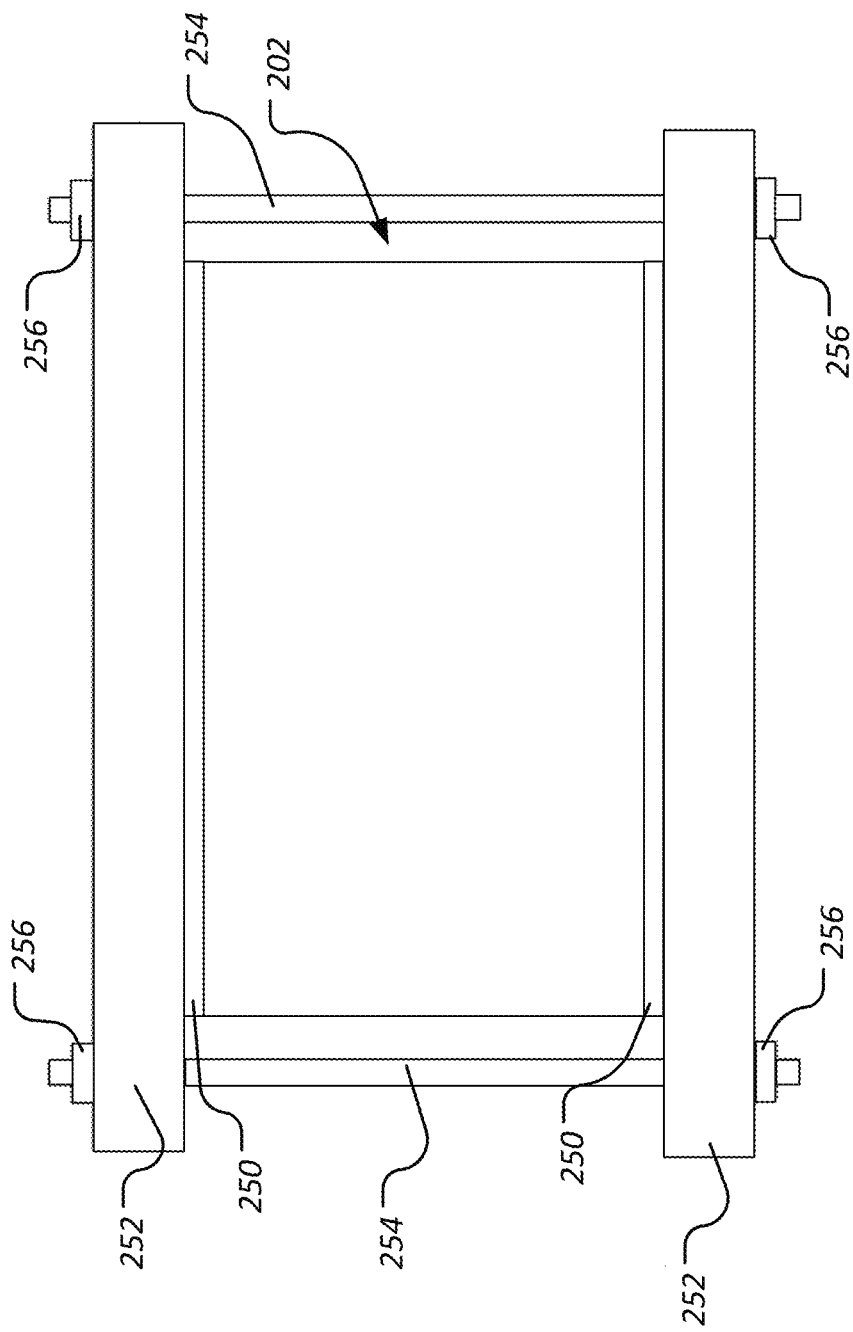
FIG. 3 is a side view of a fuel cell stack of a fuel cell system of the nacelle of FIG. 2.
Figure 4:
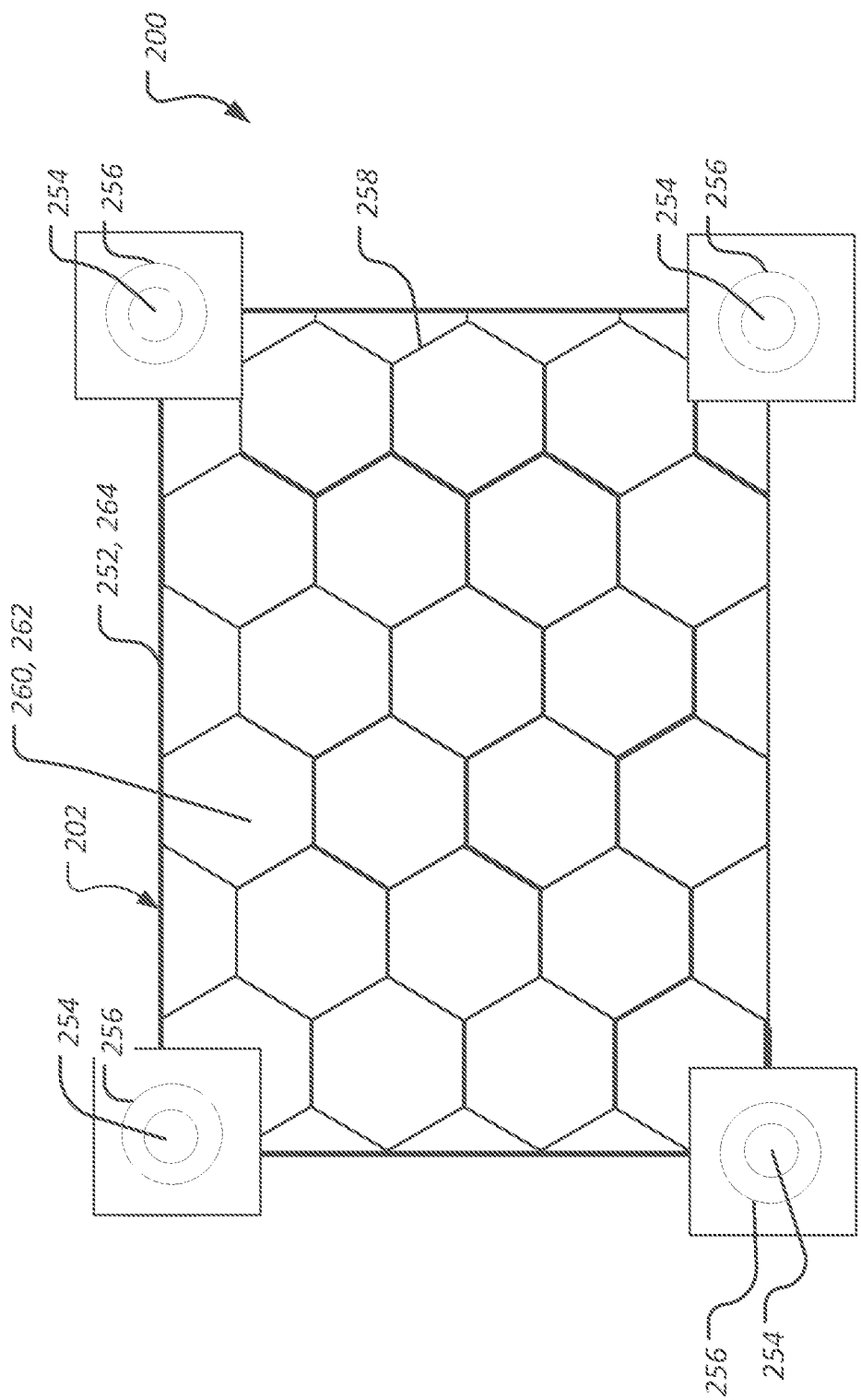
FIG. 4 is a top view of the fuel cell stack of FIG. 3.

Referring to FIGS. 3 and 4, a fuel cell stack 202 is shown. Fuel cell stack 202 is generally compacted between opposing current collectors 250 and opposing end plates 252. Bolts 254 and nuts 256 provide the compression force. In this embodiment, end plates 252 comprise a cellular honeycomb core material 258 and at least the cells 260 of a perimeter portion of the end plates are filled with a stiffening material 262. Accordingly, a stiffened area 264 of the end plates 252 allows compression of a high compression fuel cell stack 202 by pressing the end plates 252 toward each other. Once compressed into position fasteners, bands, clips, and/or any other suitable retention mechanism can be utilized to maintain the compression between the end plates 252. In this embodiment, because the end plates 252 are significantly lighter than the conventional metal end plates yet more than sufficiently stiff, the fuel cell system 202 is lighter overall thereby providing improved efficiency for an aircraft.

Figure 5:
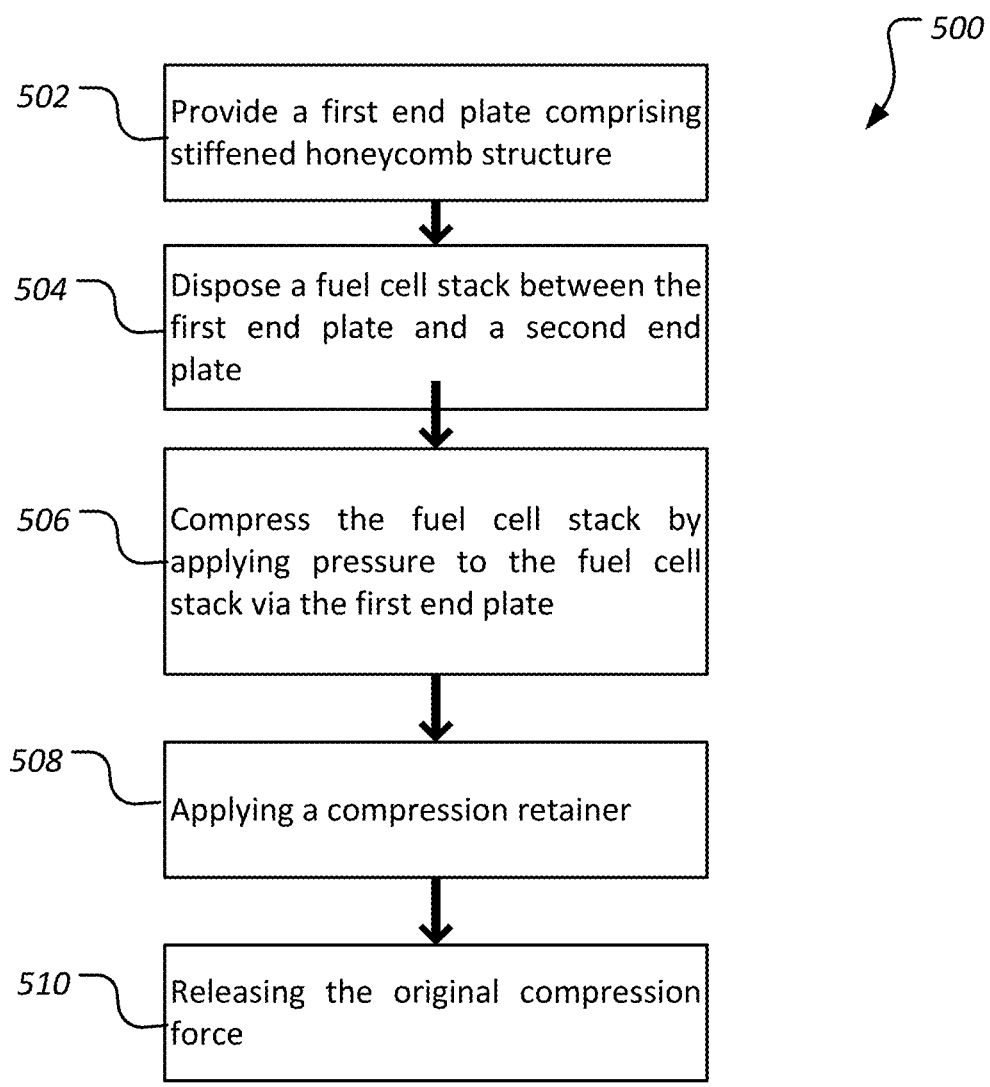
FIG. 5 is a flowchart of a method of constructing the fuel cell stack of FIG. 3.

Referring now to FIG. 5, a flowchart of a method 500 of constructing a fuel cell system is shown. The method 500 can begin at block 502 by providing a first end plate comprising stiffened honeycomb structure. Next, at block 504 the method 500 can continue by disposing a fuel cell stack between the first end plate and a second end plate. The method 500 can continue at block 506 by compressing the fuel cell stack by applying pressure to the fuel cell stack via the first end plate. Next at block 508, the method 500 can continue by applying a compression retainer such as a band or fastening system such as using nuts and bolts. The method 500 can continue at block 510 by releasing the original compression force and allowing the compression retainer to maintain the fuel cell stack compression.

Figure 6:
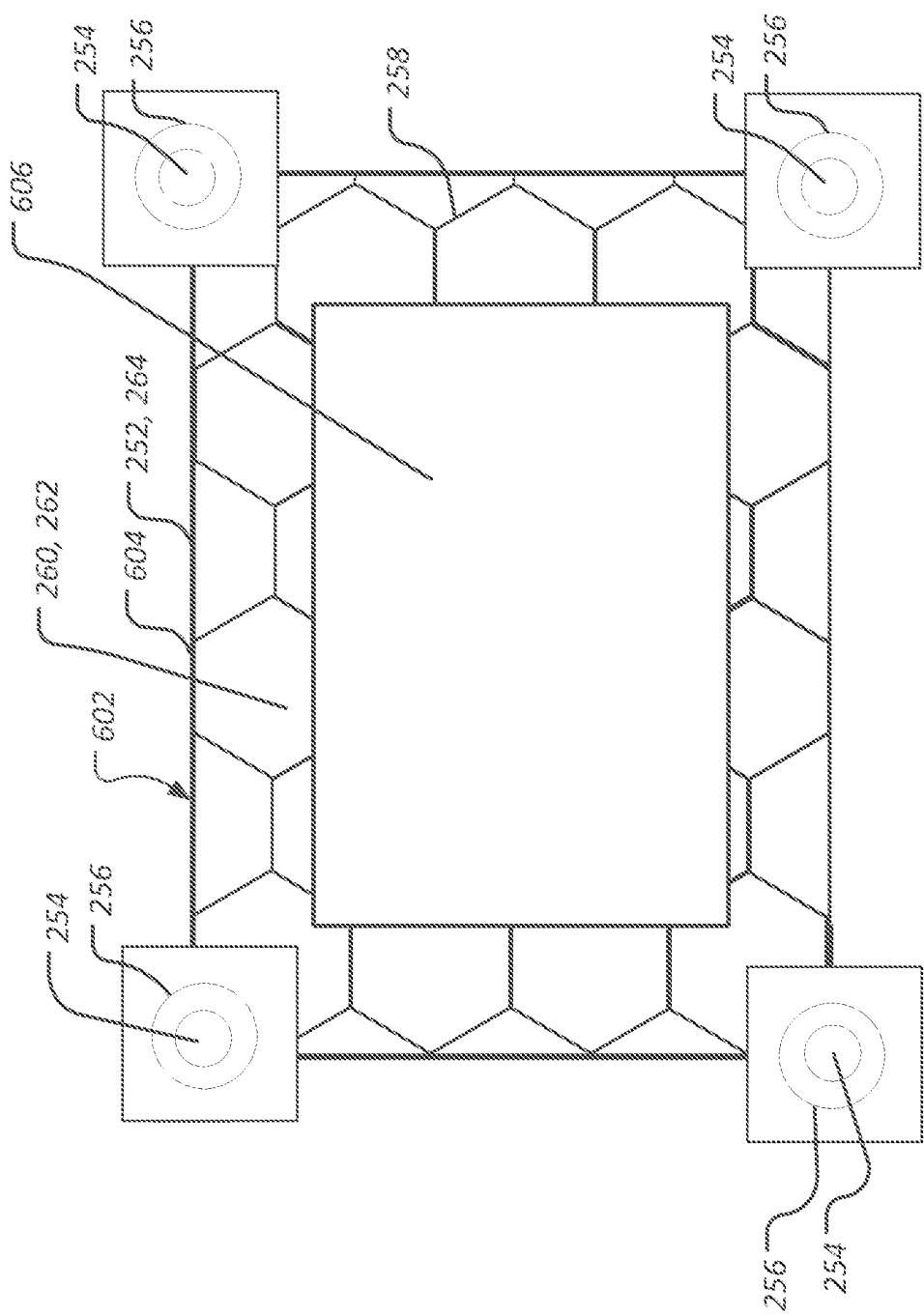
FIG. 6 is a top view of a fuel cell stack according to an alternative embodiment of this disclosure.

Referring to FIG. 6, an alternative embodiment of a fuel cell system fuel cell stack 602 is shown. Fuel cell stack 602 further comprises an end plate 604 area of unfilled and/or removed material area 606. In this embodiment, the area 606 is rectangular in shape, but in alternative embodiments, any other distribution can be utilized so long as the end plate 604 maintains the ability to compress the fuel cell stack inner components.

Figure 7:
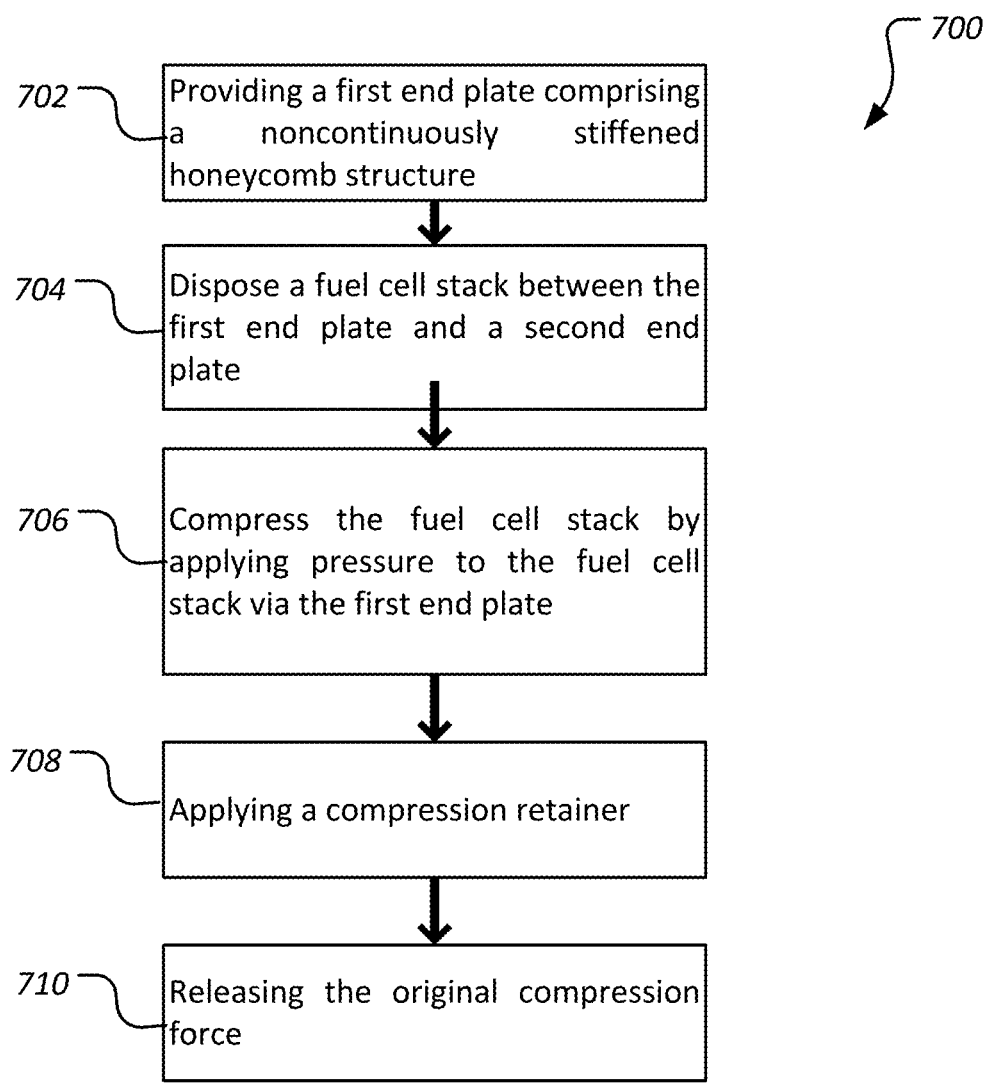
FIG. 7 is a flowchart of a method of constructing the fuel cell stack of FIG. 6.

Referring now to FIG. 7, a flowchart of a method 700 of constructing a fuel cell system is shown. The method 700 can begin at block 702 providing an end plate comprising a noncontinuously stiffened honeycomb structure. Next, at block 704 the method 700 can continue by disposing a fuel cell stack between the first end plate and a second end plate. The method 700 can continue at block 706 by compressing the fuel cell stack by applying pressure to the fuel cell stack via the first end plate. Next at block 708, the method 700 can continue by applying a compression retainer such as a band or fastening system such as using nuts and bolts. The method 700 can continue at block 710 by releasing the original compression force and allowing the compression retainer to maintain the fuel cell stack compression.

Figure 8:
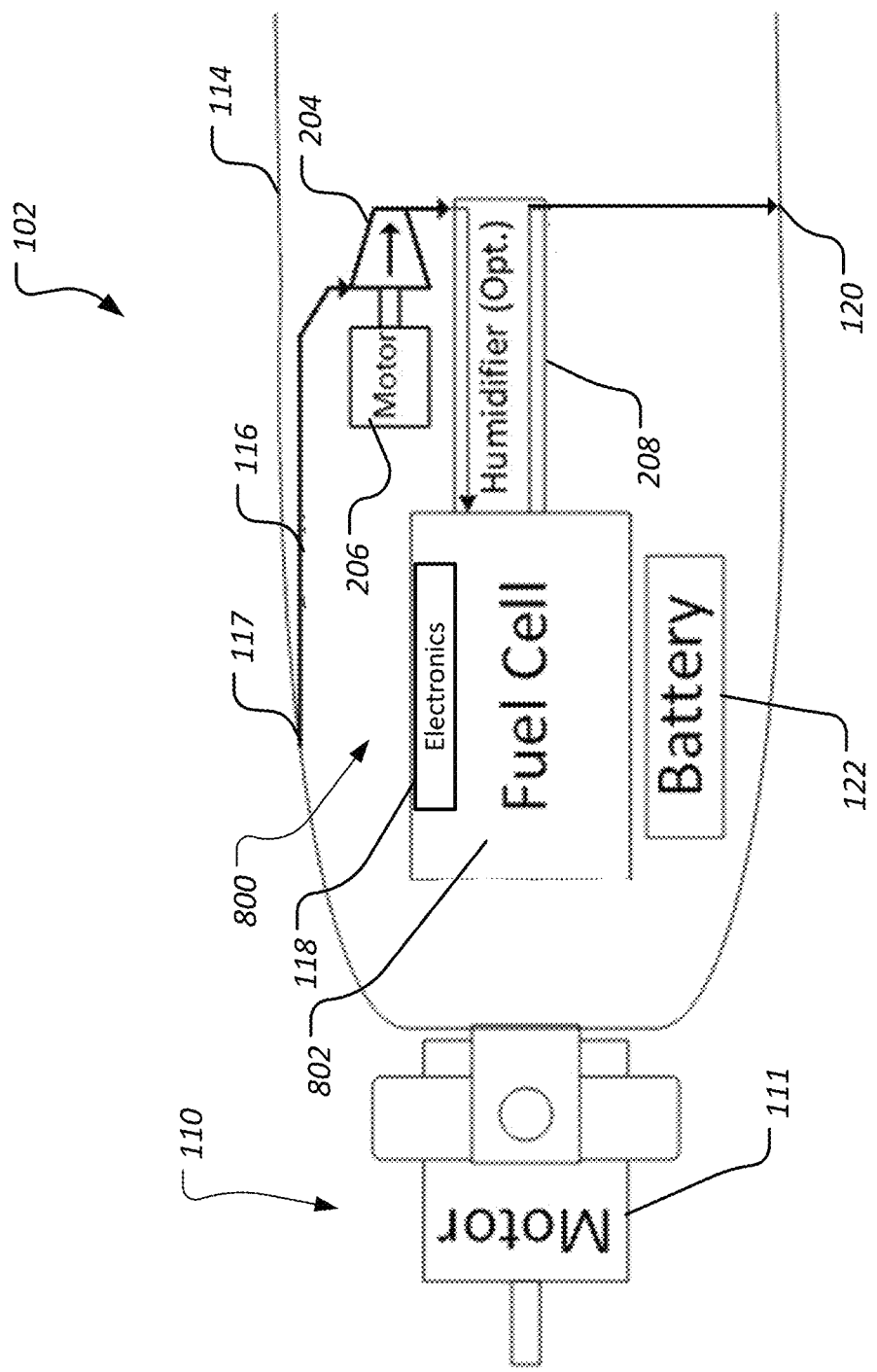
FIG. 8 illustrates a cutaway view of a nacelle according to an alternative embodiment of this disclosure.
Figure 9:
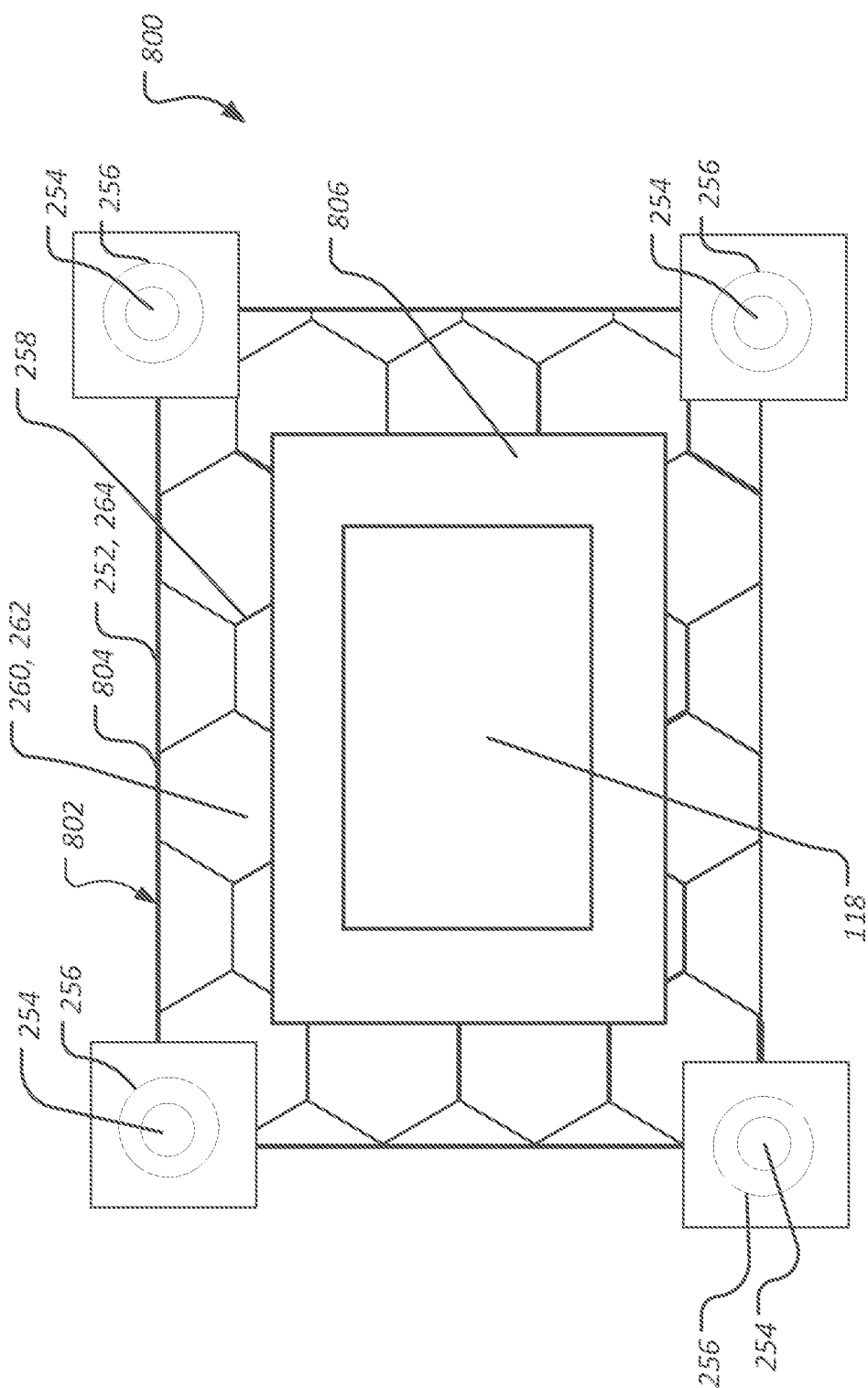
FIG. 9 is a top view of a fuel cell stack of the nacelle of FIG. 8.

Referring now to FIGS. 8 and 9, a thrust module 102 is shown comprising a fuel cell system 800 that is substantially similar to fuel cell systems 200. The fuel cell stack 802 is also constructed in substantially the same manner as the fuel cell stack 602. In this embodiment, the fuel cell system 800 locates equipment within a spatial footprint empty area 806 of the end plate 804. Accordingly, this embodiment provides both lighter weight and a reduced spatial footprint of the fuel cell system 800 as compared to fuel cell system 200. In this embodiment, electronics node 118 is disposed within the empty area 806. In some cases, lightweight material may be used to fill space between the equipment and the end plate 804 to secure the equipment in place relative to the end plate 804.

Figure 10:
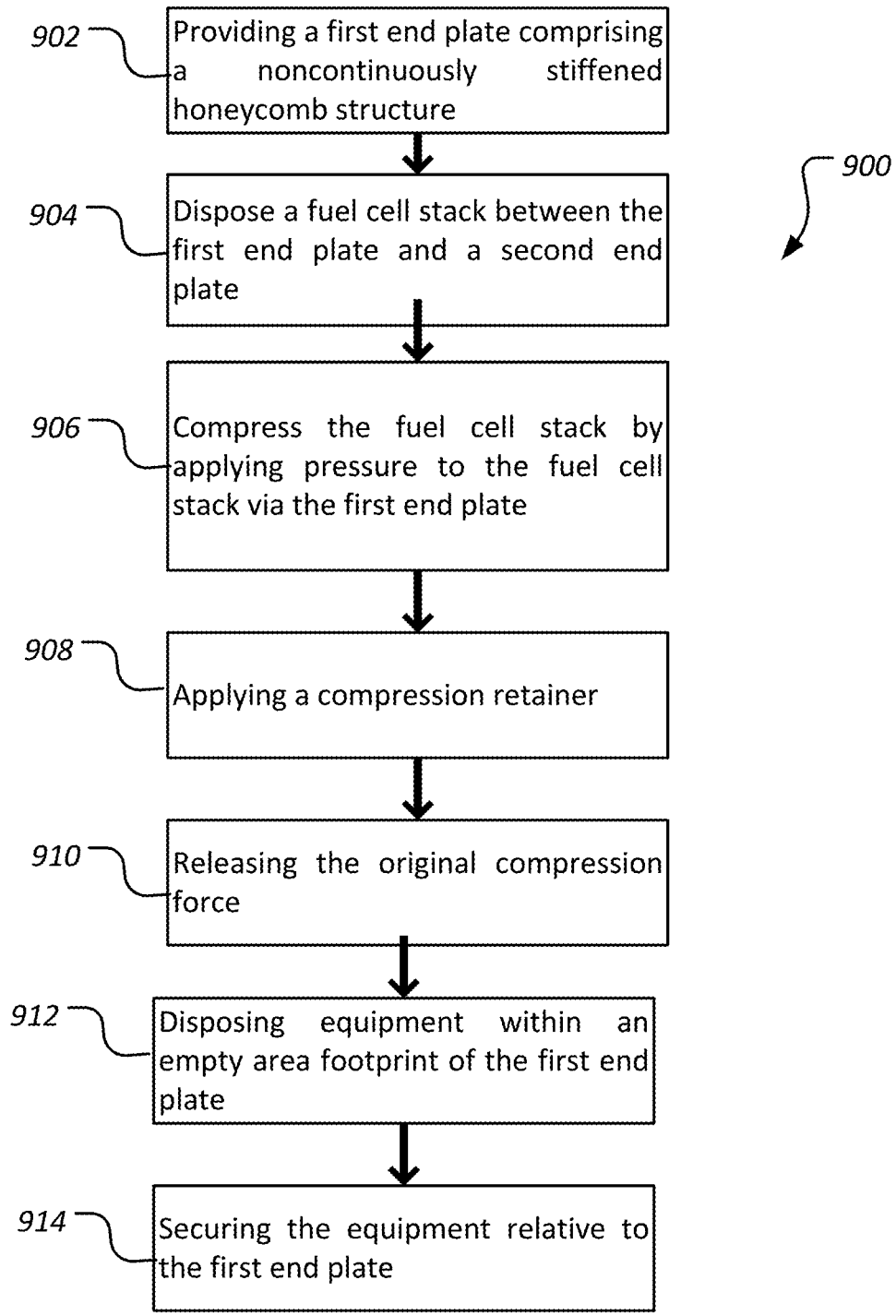
FIG. 10 is a flowchart of a method of constructing the fuel cell stack of FIG. 8.

Referring now to FIG. 10, a flowchart of a method 900 of constructing a fuel cell system is shown. The method 900 can begin at block 902 by providing an end plate comprising a noncontinuously stiffened honeycomb structure. Next, at block 904 the method 900 can continue by disposing a fuel cell stack between the first end plate and a second end plate. The method 900 can continue at block 906 by compressing the fuel cell stack by applying pressure to the fuel cell stack via the first end plate. Next at block 908, the method 900 can continue by applying a compression retainer such as a band or fastening system such as using nuts and bolts. The method 900 can continue at block 910 by releasing the original compression force and allowing the compression retainer to maintain the fuel cell stack compression. At block 912, the method 900 can continue by disposing equipment (such as electronics) within an empty area footprint of the first end plate. At block 914, the method can continue by securing the equipment relative to the first end plate, such as by filling the gap space with a lightweight filler material.

Figure 11:
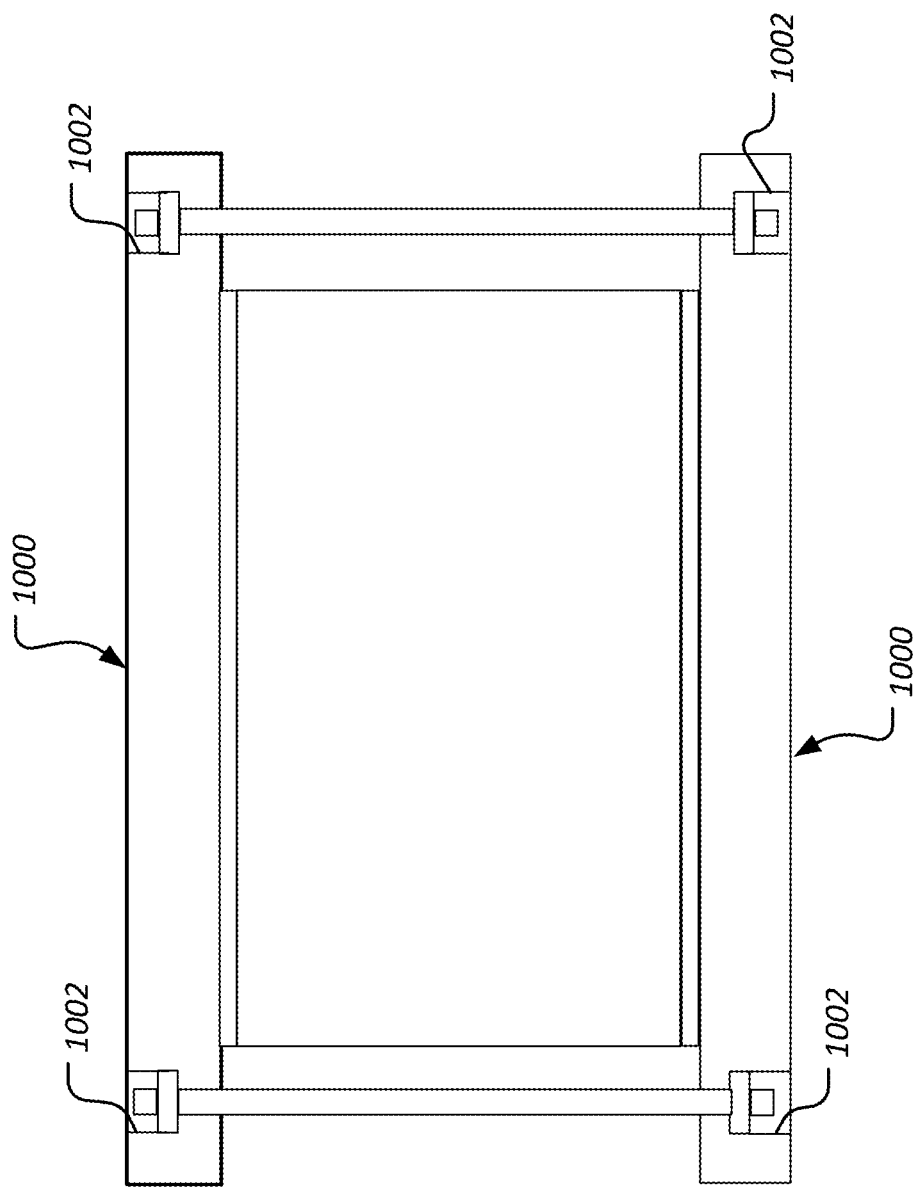
FIG. 11 is a cutaway side view of a fuel cell stack according to an alternative embodiment of this disclosure.

Referring now to FIG. 11, a cutaway view of an alternative embodiment of an end plate 1000 is shown. End plate 1000 is substantially similar to end plates 252, 604, and/or 804, but also comprises holes 1002 formed in the end plate 1000 and in the stiffening material to receive fasteners so that, for example, bolts and rods do not extend beyond a footprint of the end plate 1000.

It will be appreciated that this disclosure provides a honeycomb open cell structure end plate for a high compression high power fuel cell stack. The stiffness of the honeycomb open cell structure can be increased by filling certain cells with a strong thermoplastic polymer like polyether ether ketone (PEEK). In some cases, the honeycomb open cell structure can be constructed of aramid (Kevlar) or carbon fiber so that the structures are thermally resistant to the sometimes-high operating temperatures of the fuel cell system itself. In any case, whatever materials are utilized in constructing or filling the open cell structure, the open cell structure and filling material can be selected to have material properties that are not substantially degraded when exposed to the sometimes relatively high temperatures of the fuel cell stack to which the structure is compresses against. Because the combination of the open cell structure and the filler material is relatively lightweight, the resulting reduced mass of end plates disclosed herein as compared to conventional end plates allows for better system integration. Further, the equipment located within the footprint of the end plate can comprise equipment related to inputs and outputs of hydrogen, air, gas, electricity, cooling fluid, temperature sensors, and/or other fuel cell system and/or aircraft related equipment. Such aircraft related equipment can comprise any other equipment, including, but not limited to, wireless communication systems, or avionics. By making use of this otherwise empty space, the center of end plate can be loaded for balance-of-plant systems, thereby reducing volume. In some embodiments, no skin is disposed to close an open cell structure. In some embodiments, equipment such as electronics can be disposed so that it does not extend beyond an exterior footprint of a first end plate. In some embodiments, no portion of filler material extends beyond a footprint of a first end plate. In some embodiments, equipment can comprise at least one of (1) equipment required for operation of the fuel cell system and (2) equipment related to controlling the aircraft and not essential to operation of the fuel cell system.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-$ $R_l$), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A fuel cell system, comprising:
    a first end plate comprising an open cell structure;
    a second end plate comprising an open cell structure; and
    a fuel cell stack compressed between the first end plate and the second end plate;
    wherein polyether ether ketone is disposed within a plurality of cells of the first end plate and the second end plate; and
    wherein compression of the fuel stack is maintained by tensioning a fastener that at least one of axially and laterally overlaps both the first end plate and the second end plate.

2. The fuel cell system of claim 1, wherein the fastener is disposed within a concavity of the first end plate.

3. The fuel cell system of claim 2, wherein an interior portion of the first end plate is removed to create an empty area.

4. The fuel cell system of claim 3, wherein the empty area is surrounded by a perimeter of filled portions.

5. The fuel cell system of claim 3, wherein equipment is disposed within the empty area.

6. The fuel cell system of claim 5, wherein the equipment does not extend beyond an exterior footprint of the first end plate.

7. The fuel cell system of claim 6, wherein the equipment comprises electronics.

8. The fuel cell system of claim 5, wherein at least a portion of an area between the equipment and the first end plate is filled with a filler material to secure the equipment relative to the first end plate.

9. The fuel cell system of claim 8, wherein no portion of at least one of the equipment and the filler material extends beyond a footprint of the first end plate.

10. An aircraft, comprising:
    a fuel cell system, comprising
        a first end plate comprising an open cell structure;
        a second end plate comprising an open cell structure; and
        a fuel cell stack compressed between the first end plate and the second end plate;
    wherein a plurality of cells of the first end plate and the second end plate are at least partially filled with polyether ether ketone; and
    wherein compression of the fuel stack is maintained by tensioning a fastener that at least one of axially and laterally overlaps both the first end plate and the second end plate.

11. The aircraft of claim 9, wherein equipment is received within a footprint of the first end plate.

12. The aircraft of claim 11, wherein the equipment comprises at least one of (1) equipment required for operation of the fuel cell system and (2) equipment related to controlling the aircraft and not essential to operation of the fuel cell system.

13. A tailsitter unmanned aerial vehicle, comprising:
    a first nacelle, comprising:
        a fuel cell system, comprising
            a first end plate comprising an open cell structure;
            a second end plate comprising an open cell structure;
            a fuel cell stack compressed between the first end plate and the second end plate; and
            a first electrical component;
        wherein a plurality of cells of the first end plate are at least partially filled with polyether ether ketone; and
        wherein compression of the fuel stack is maintained by tensioning a fastener that at least one of axially and laterally overlaps both the first end plate and the second end plate; and
    a second nacelle, comprising a second electrical component;
    wherein the fuel cell system can supply electrical power to the first electrical component and the second electrical component selectively and simultaneously.

* * * * *